United States Patent
RovelleQuartz

(10) Patent No.: US 9,721,298 B2
(45) Date of Patent: Aug. 1, 2017

(54) TRADE-CREDIT EXCHANGE APPARATUS

(76) Inventor: Auden RovelleQuartz, Caledonia, WI (US)

( * ) Notice: Subject to any disclaimer, the term of this patent is extended or adjusted under 35 U.S.C. 154(b) by 41 days.

(21) Appl. No.: 13/108,783

(22) Filed: May 16, 2011

(65) Prior Publication Data
US 2012/0296808 A1    Nov. 22, 2012

(51) Int. Cl.
*G06Q 40/04* (2012.01)
*G06Q 30/08* (2012.01)
*G06Q 30/02* (2012.01)
*G06Q 30/06* (2012.01)

(52) U.S. Cl.
CPC ............ *G06Q 40/04* (2013.01); *G06Q 30/02* (2013.01); *G06Q 30/06* (2013.01); *G06Q 30/08* (2013.01)

(58) Field of Classification Search
CPC ........ G06Q 40/04; G06Q 30/06; G06Q 30/08; G06Q 30/0601; G06Q 50/188; G06Q 20/12; G06Q 30/02; G06Q 30/0207; G06Q 30/0613; G06Q 30/0641; G06Q 40/00; G06Q 40/06; G06Q 10/00; G06Q 10/0631
See application file for complete search history.

(56) References Cited

U.S. PATENT DOCUMENTS

| | | | |
|---|---|---|---|
| 6,847,938 B1* | 1/2005 | Moore | G06Q 30/0613 705/26.41 |
| 7,624,041 B2 | 11/2009 | Postrel | |
| 7,680,726 B2 | 3/2010 | Himmelstein | |
| 2001/0005829 A1* | 6/2001 | Raveis, Jr. | G06Q 30/02 705/316 |
| 2002/0069117 A1* | 6/2002 | Carothers et al. | 705/26 |
| 2007/0067236 A1* | 3/2007 | Deinhardt | G06Q 20/04 705/39 |
| 2008/0103987 A1* | 5/2008 | Bocheck | 705/80 |
| 2009/0024500 A1* | 1/2009 | Kay | G06Q 40/00 705/35 |
| 2009/0076941 A1* | 3/2009 | Schneierson et al. | 705/37 |
| 2010/0235288 A1* | 9/2010 | Kisbye | G06Q 20/02 705/80 |
| 2010/0280919 A1* | 11/2010 | Everett et al. | 705/27 |
| 2011/0166962 A1* | 7/2011 | Koponen et al. | 705/27.1 |
| 2011/0196760 A1* | 8/2011 | Howard et al. | 705/26.41 |

OTHER PUBLICATIONS

Grzegorz Michalski, "Portfolio Management Approach in Trade Credit Decision Making," Romanian Journal of Economic Forecasting, 3 (2007), pp. 42-53.*

Inessa Love et al., "Trade Credit and Bank Credit: Evidence from Recent Financial Crises," Journal of Financial Economics, 83 (2007), pp. 453-469.*

Murray Z. Frank and Vojislav Maksimovic, "Trade Credit, Collateral, and Adverse Selection," SSRN Electronic Journal, (Oct. 2005), pp. 1-40.*

U.S. Appl. No. 10/583,395, filed May 31, 2007, Elias, Daniel et al.

(Continued)

*Primary Examiner* — Virpi Kanervo
(74) *Attorney, Agent, or Firm* — Richards Patent Law P.C.

(57) ABSTRACT

An apparatus configured with software that enables participants to exchange trade-credit comprising one or more databases and processing components and which utilizes automated value matching algorithms and trade search engine algorithms to discover and process exchange paths.

6 Claims, 5 Drawing Sheets

(56) References Cited

OTHER PUBLICATIONS

U.S. Appl. No. 12/268,471, filed May 13, 2010, Betzler, Boas et al.
U.S. Appl. No. 09/848,775, filed Jan. 10, 2002, Bradford, Kevin B. et al.
U.S. Appl. No. 10/086,116, filed Jan. 16, 2003, Neff, Roy et al.
U.S. Appl. No. 11/229,950, filed Mar. 23, 2006, Hardwick, Jessica.

* cited by examiner

TRADE-CREDIT EXCHANGE APPARATUS

FIELD OF INVENTION

The present invention relates to compute hardware configured to allow multiple participants (e.g. businesses, individuals, etc.) to transfer and exchange trade-credit.

TERMS OF ART

Figure 1:
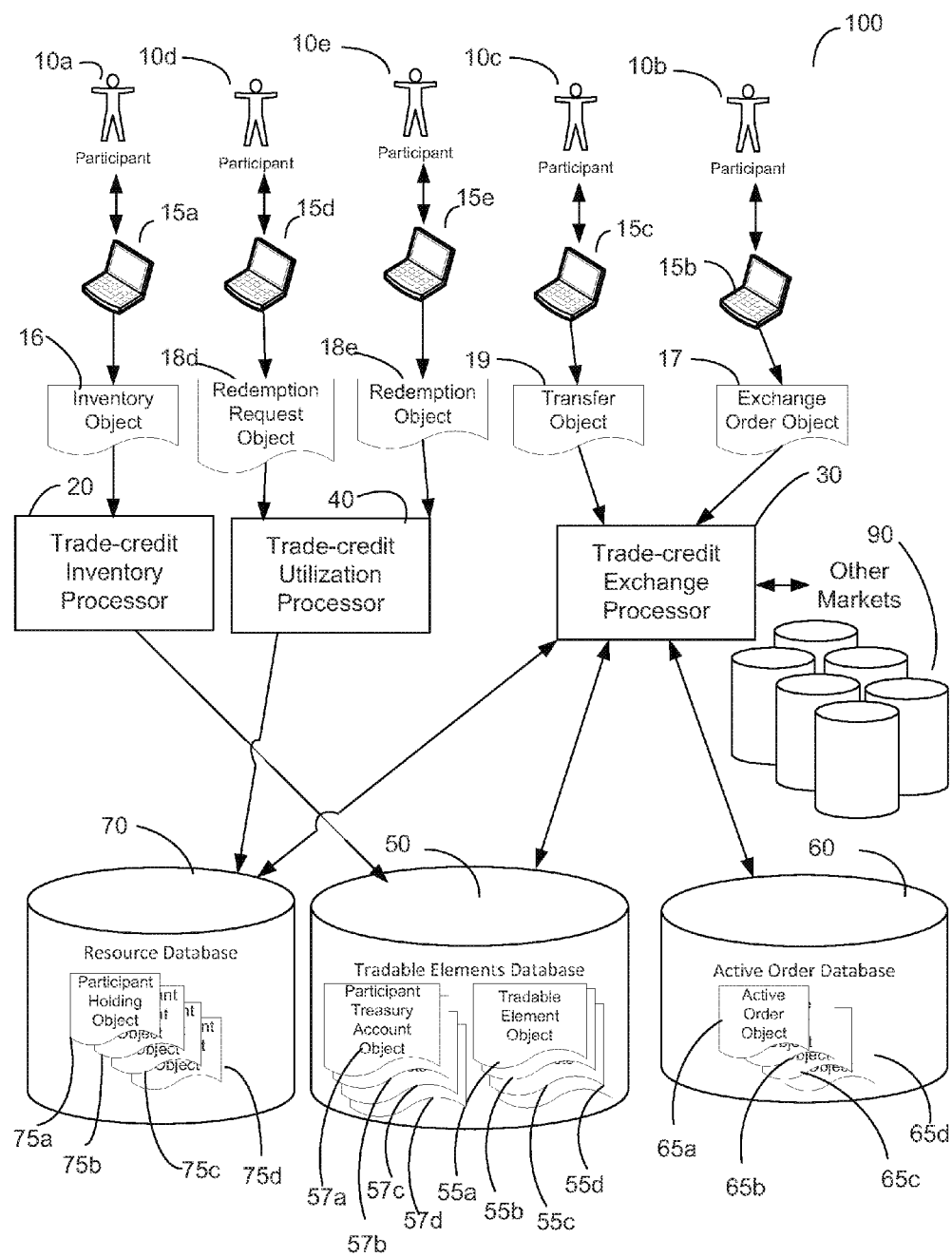
FIG. 1 is an exemplary embodiment of a trade-credit exchange apparatus.

As used herein, the term "acquired trade-credit" refers to trade-credit issued by a first participant, and acquired by one or more participants, which the first participant is obligated to accept in payment.

As used herein, the term "authorized trade-credit" refers to trade-credit which one or more participants have authorized to be issued in their treasury account.

As used herein, the term "automated value matching algorithms" refers to a process used to determine and place parallel exchange-orders based on issuer-stated valuations.

As used herein, the term "backend processor" refers to a computer processing component which performs an operation that is not seen by a user.

As used herein, the term "business" refers to any participant which may use trade-credit exchange apparatus. Business may encompass individuals, non-profit institutions, governing agencies, and other entities.

As used herein, the term "business trade-credit" refers to a type of trade-credit issued by a business which the business agrees to accept "as good as cash" in any transaction with the issuer where cash would be accepted.

As used herein, the term "client" means a receiver of trade-credit. Clients may be participants within the trade-credit exchange system and may also be suppliers of trade-credit within the system.

As used herein, the term "commodity" refers to any product or service exchanged or acquired within a trade-credit exchange system.

As used herein, the term "common exchange medium" refers to an exchange medium (e.g. cash, barter dollars, gold, etc.) that is fungible and is accepted as payment by members of a defined trade economy (e.g., a country, barter club, etc.).

As used herein, the term "compound order" refers to an order that can be decomposed into two or more of any combination of trade-orders and/or market-orders that would be accepted by the participant placing the order. Typically, compound orders are used to allow expanded options for trade transactions to occur and/or to define limits on the aggregate volume of trade transactions pertaining to the compound order.

As used herein, the term "database" includes, but is not limited to, physical memory, temporary or permanent storage of data, object and record attributes, lists, data structures, physical storage components, virtual storage components and any other manner of storing data known in the art used to perform a function.

As used herein, the term "designated securities" refers to securities (typically stocks or bonds) which allow the issuers of the securities to have dividends or yields paid in terms of trade-credit (specified by the issuers of the securities), allowing issuers to offer higher trade-credit face-value while conserving cash resources. The holders of "designated securities" do not necessarily have a right to receive their dividends or yields in terms of cash.

As used herein, the term "distributed" means that physical and logical components, data recipients, and/or participants may be in a single location or in multiple locations.

As used herein, the term "dividend and yield trade-credit" refers to a type of trade-credit issued (usually by the holder of a stock or bond security) where the issuer agrees to give up his/her right to receive cash dividends or cash yield payment in exchange for receiving some other specified form of trade-credit (typically at a greater face-value than the cash amount being given-up).

As used herein, the term "downstream" refers to the trade-credit exchanges on sequentially linked paths formed by matching exchange order demands with exchange order offers.

As used herein, the term "exchange order" refers to either a trade-order or market-order.

As used herein, the term "exchange order object" refers to an object containing attributes pertaining to an exchange order, including, but not limited to, the tradable-element requested, the tradable-element offered, and the value associated with the exchange order.

As used herein, the term "exchange path" refers to a closed exchange pathway consisting of at least two participants or one participant and one market participant which links the demands and offers of each participant.

As used herein, the term "holdings account" refers to a ledger maintained by a trade-credit exchange apparatus which contains accountings of a participant's trade-credit assets, trade-credit obligations, common exchange media and any other non-treasury spendable assets or performance obligations.

As used herein, the term "inventory object" refers to an object containing attributes pertaining to a participant's request to authorize trade-credit to the participant's own treasury account, including, but not limited to, the amount of trade-credit and valuation method.

As used herein, the term "labor trade-credit" refers to a type of trade-credit issued by an individual which the individual agrees to accept "as good as cash" in any labor-payment transaction with the issuer where cash would be accepted.

As used herein, the term "market-order" refers to a trade-order where the exchange of trade-credit is done via a common exchange medium, e.g. any ISO 4217 currency (i.e. cash, gold, silver, etc.), barter dollars, commodity units, etc., instead of being done via vendor-specific trade-credit.

As used herein, the term "market participant" refers to an individual or entity transacting with trade-credit exchange apparatus from a market other than the trade-credit market.

As used herein, the term "network connection" refers to any software or hardware that allows two or more computers or devices to communicate with one another.

As used herein, the term "object" refers to a data structure which includes data attributes and/or functions.

As used herein, the terms "parallel orders," "parallel market-orders," and "parallel trade-orders" refer to exchange orders where if any one of the exchange orders is executed, the other exchange orders are cancelled.

As used herein, the term "participant" refers to an individual or entity authorized to use a trade-credit exchange apparatus.

As used herein, the term "participant holding object" refers to an object containing attributes and data associated with a specific user, including, but not limited to, any one or more of participant identifying information, balances of common exchange media, trade-credit assets and trade-credit obligations. Participant holding objects may also include functions for modifying such attributes.

As used herein, the term "participant treasury account object" refers to an object containing attributes and data associated with a specific user, including, but not limited to, any one or more of participant identifying information, issued trade-credit and associated valuation methods. Participant treasury account objects may also include functions for modifying such attributes As used herein, the term "personal trade-credit" refers to a type of trade-credit issued by an individual which the individual agrees to accept "as good as cash" in any transaction with the issuer where cash would be accepted.

As used herein, the term "physical storage component" refers to any data storage device, including, but not limited to, computer memory, disks, internal or external hard drives, flash drives, and other memory devices.

As used herein, the term "processor" refers to any hardware component configured with software to perform a calculation, function or operation. As used herein, a processor may also refer to a function that resides on a physical device.

As used herein, the term "redemption object" refers to an object containing attributes pertaining to the redemption of trade-credit, including, but not limited to, the amount of trade-credit being redeemed, the redeemer of the trade-credit and the issuer of the trade-credit.

As used herein, the term "specific account trade-credit" refers to a type of trade-credit issued by a business which the business agrees to accept "as good as cash" in any transaction with the issuer where cash would be accepted and where the subject of the transaction is limited to one or more specific accounts where the definition of the specific accounts can be done either by explicit or exclusionary filters. A non-limiting example of specific account trade-credit is trade-credit issued by a financial institution and accepted by the institution as good as cash, but only applicable for a specified set of delinquent loan accounts.

As used herein, the term "specific element trade-credit" refers to a type of trade-credit issued by a business which the business agrees to accept "as good as cash" in transactions with the issuer where cash would be accepted and where the subject of the transaction is limited to one or more specific elements where the definition of the specific elements can be done either by explicit or exclusionary filters. A non-limiting example of specific element trade-credit is trade-credit issued by an electronics store which is accepted by the store just as good as cash, but is only applicable to the purchase of a specific model television.

As used herein, the term "specific hirer trade-credit" refers to a type of trade-credit issued (usually by an individual) which the issuer agrees to accept "as good as cash" in any transaction between one or more specific hirers and the issuer where cash would normally be accepted. A non-limiting example of specific hirer trade-credit is trade-credit issued by an individual which is accepted by the individual for payment-transactions with a hirer and where specification of the hirer can be done either by explicit or exclusionary filters.

As used herein, the term "specific labor trade-credit" refers to a type of trade-credit issued by an individual person which the individual agrees to accept "as good as cash" for labor-payment transactions with the issuer where cash would normally be accepted and where the labor involved is limited to one or more specific types of labor or one or more types of services where the specification of the types of labor or specific types of services can be done either by explicit or exclusionary filters. A non-limiting example of specific labor trade-credit is trade-credit issued by a software programmer which is accepted just as good as cash for payment for labor, but only applicable to labor involving developing software.

As used herein, the term "specific remitter trade-credit" refers to a type of trade-credit issued (usually by a business) which the issuer agrees to accept "as good as cash" in any transaction, between one or more specified remitters and the issuer, where cash would be accepted. A non-limiting example of specific remitter trade-credit is trade-credit issued by a business and accepted as good as cash only for transactions where the trade-credits are presented by those belonging to a "Premium Membership Club."

As used herein, the term "tax trade-credit" refers to a type of trade-credit issued by a taxing authority which the taxing authority agrees to accept "as good as cash" for any type of tax payment transactions with the issuer where cash would be accepted.

As used herein, the term "third-party" refers to any entity that is neither a vendor nor a client to any of the participants in a trade transaction.

As used herein, the term "tradable element" refers to any element defined as trade-credit which may be selected by a participant in the creation of a market or trade-order, or any element defined as a currency or other common exchange media which may be selected by a participant in creation of a market-order.

As used herein, the term "trade-credit" refers to participants' privately issued payment-offset vouchers that can be exchanged within the system for other participants' privately issued payment-offset vouchers. As used herein, trade-credit includes, but is not limited to, business trade-credit, personal trade-credit, labor trade-credit, specific element trade-credit, specific account trade-credit, specific labor trade-credit, tax trade-credit, specific remitter trade-credit, specific hirer trade-credit, and dividend and yield trade-credit.

As used herein, the term "trade-credit asset" refers to spendable trade-credit in a participant's holding account that is issued by another participant.

As used herein, the term "trade-credit obligation" refers to trade-credit a participant is obligated to accept when presented as payment.

As used herein, the term "trade-credit order object" refers to an object containing attributes pertaining to a request to exchange trade-credit.

As used herein, the term "trade-credit order object properties" refers to attributes associated with a trade-credit order object, including, but not limited to, trade-credit requested, trade-credit offered, and the value associated with the trade-credit.

As used herein, the term "trade-order" is a request to exchange trade-credit.

As used herein, the term "trade search engine" refers to a process used to determine exchange paths.

As used herein, the term "transfer object" refers to an object containing attributes pertaining to a request to transfer trade-credit, including, but not limited to, the amount of trade-credit and participant to which the trade-credit is to be transferred.

As used herein, the term "treasury account" refers to a set of database records maintained for a participant defining the amounts of, and the valuation methods to be used with, a participant's own privately-issued trade-credit with which he/she is authorized to trade.

As used herein, the term "undesignated securities" refers to securities (typically stocks or bonds) where the holder of the securities can offer to give up his/her right to receiving dividends or yield cash payments in exchange for receiving trade-credit (specified by the holder of the securities), allowing those holders of the securities to receive a higher (than the cash) trade-credit face-value.

As used herein, the term "user interface" refers to any device which may interface with a processor, database or other component of a trade-credit exchange apparatus through any communication method known in the art, including, but not limited to, internet communications, wireless communications, Wide Area Networks, Local Area Networks and any combination thereof.

As used herein, the term "vendor" means a supplier of trade-credit. Vendors may be participants within the trade-credit exchange system and may also be acquirers of trade-credit within the system.

BACKGROUND

There are significant amounts of unused trade potential in the market, where businesses would like to acquire goods and services of other businesses, but cannot do so because the businesses lack an available medium of exchange (e.g., cash or credit).

There are millions of businesses that have limited cash resources, but that also have other valuable resources and could use the resources of other businesses profitably if there was a way for businesses to acquire each other's resources without the need for cash as a medium of exchange. The ability of businesses to acquire each other's resources without cash is obviously desirable in recessionary times. It can also be useful in times of economic boom for businesses unable to efficiently access traditional cash and credit markets to meet their trading needs, or when businesses are willing to expand, and do have access to traditional credit markets but where credit is costly.

For example, assume Business A needs skilled workers to provide labor but has abundant raw materials for production, and Business B needs raw materials for production, but has idle skilled labor. Both businesses may have limited access to cash as a medium of exchange, but may be able to productively use each other's resources profitably.

In the above simplified exemplary scenario, each of the two hypothetical businesses mutually wanted what the other business had an abundance of and had an abundance of what the other business wanted. In reality however, it is often unlikely that two business would have such an exact match of requests (demands) and offers (supplies), at the same time, and in matching quantities; and even if that were the case, it may be even more unlikely that they would randomly meet in the marketplace at a time when they would simultaneously be interested in executing the trade.

As previously described, it may be unlikely and/or difficult for two businesses to realize and consummate an exact match of requests and offers; however it is possible to provide a framework wherein businesses can each enter their requests and offers. Trade-search engines can then derive and use information from the data entered to find direct and/or indirect matches for requests and offers.

Bartering systems which provide an alternative to using cash as a medium of exchange are known in the art. Businesses which facilitate barter can be highly profitable. There are currently over 350,000 businesses in the United States participating in bartering and cashless exchange activities, with over $10 billion of transactions occurring in worldwide bartering transactions.

Bartering companies, such as ITEX, International Monetary Systems and BizXchange handle millions of dollars in transactions every year with thousands of members worldwide, making bartering an established, recognized and profitable form of commercial exchange.

In bartering systems known in the art, such as ITEX Corporation, International Monetary Systems, Ltd., and BizXchange, the participants trade using a barter currency. The barter currency is a common exchange medium that is used within the barter network, and this barter currency is typically pegged to an established currency, whether US dollars, Euros, or other currency. For example, the barter currency may be pegged to the US dollar, in which case they may be often referred to as "trade dollars", or "barter dollars." Each barter system typically has its own centrally issued brand of barter currency. For example, ITEX uses "ITEX trade dollars," IMS uses "IMS trade dollars," and BizXchange uses "BizX trade dollars."

One issue with current bartering systems, however, is the need to control inflation within the system and the dilution of issued trade dollars in circulation. Inflation within traditional barter systems is therefore centrally controlled by a bartering system administrator, acting as a third-party which regulates the issuance of the barter currency.

Another issue with current bartering systems is the third-party control of available exchange media in circulation. In current systems known in the art, the amount of exchange media in circulation is not necessarily directly driven by market demand. Rather, the amount of exchange media in circulation is determined by the third-party issuer of exchange media and may, in part, be based on a subjective assessment of the market demand.

It desirable to have a system and apparatus in place which allows businesses to exchange each other's resources in a free and liquid manner without a necessary requirement that the businesses possess a common exchange media, but rather are able to use the businesses' own privately-issued trade-credit to exchange for other businesses' privately-issued spendable trade-credit.

It is desirable to have a system that does not require a third-party to issue exchange media into circulation (e.g., cash, barter currency, or privately issued trade-credit) for trade transactions to occur, but which instead, in addition to allowing businesses the ability to trade using exchange media issued by third-parties, allows businesses the ability to trade using their own privately-issued trade-credit.

It is desirable to have a system wherein the inflationary potential inherent in current barter systems becomes self-balancing and constrained by market forces, without requiring that a third-party administrator directly manage the issuance of exchange media into circulation.

It is desirable to have a system which can decrease businesses' dependence on traditional financial institutions as sources of financing by providing alternative and complementary types and sources of business credit.

It is also desirable to have a system and apparatus which can increase businesses' potential customer base for participating businesses by encouraging alternative forms of payment.

SUMMARY OF THE INVENTION

The present invention is an apparatus configured with software to allow participants to directly exchange trade-credit. In various embodiments, the system includes software and hardware processing components which utilize automated value matching algorithms, and algorithms to determine the most efficient exchange paths.

Participants authorize trade-credit (i.e. issue trade-credit) into their own treasury accounts. Treasury accounts maintain records of the amount of trade-credit issued and the valuation methods to be used with trade-orders that use the issued trade-credit. Participants may then place trade-orders and market-orders using the participant's own trade-credit. Participants may also use acquired trade-credit from other participants to place trade-orders and market-orders.

With this apparatus, trade-credit exchanges occur simultaneously within discovered exchange paths. The ability to simultaneously execute those exchanges, thereby providing participants with spendable trade-credit as an alternative to cash, is an inherent characteristic of the trade-credit exchange apparatus.

DETAILED DESCRIPTION OF INVENTION

For the purpose of promoting an understanding of the present invention, references are made in the text to exemplary embodiments of a trade-credit exchange apparatus, only some of which are described herein. It should be understood that no limitations on the scope of the invention are intended by describing these exemplary embodiments. One of ordinary skill in the art will readily appreciate that alternate but functionally equivalent structures, hardware components and processes may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 is an exemplary embodiment of trade-credit exchange apparatus 100. As shown in FIG. 1, trade-credit exchange apparatus 100 contains three main processors (trade-credit inventory processor 20, trade-credit exchange processor 30, and trade-credit utilization processor 40) and three main databases (tradable elements database 50, active order database 60, and resource database 70).

Trade-credit inventory processor 20 allows participants to register their own trade-credit into tradable elements database 50 as a tradable element. A participant's trade-credit being registered in tradable elements database 50 allows other participants to request the trade-credit in creating a trade-order or market-order. However, trade-credit registered in tradable elements database 50 is neither necessarily issued to the participant's treasury account nor necessarily on the market to be acquired.

As illustrated in FIG. 1, participant 10a, using user interface 15a, defines an amount of trade-credit to be issued and a valuation method or methods for the trade-credit to generate inventory object 16. Valuation methods are either issuer-stated or auction-based and are used to determine transactional fees, such as tax and commission, which may be charged to a participant for a transaction. Trade-credit inventory processor 20 receives inventory object 16 and updates the treasury account associated with participant 10a, to reflect the issued trade-credits as tradable element object 55.

Trade-credit exchange processor 30 allows the participant to place a trade-order where the trade-credit being offered is from either the participant's treasury account or the participant's holdings account, but only if there are sufficient available trade-credits in a participant's treasury account or holdings account to cover the amount of trade-credit being offered in the trade-order.

Participants may also place market-orders, where trade-credit or a common exchange medium, such as cash, is offered from the participant's holdings account, but only if there are sufficient available trade-credits or exchange medium in a participant's account to cover the amount of trade-credit or exchange medium being offered in the market-order.

As illustrated in the exemplary embodiment shown in FIG. 1, participant 10b, using user interface 15b, has generated exchange order object 17 containing exchange order object properties, including the demand and offer.

In the exemplary embodiments shown in FIG. 1, trade-orders and market-orders are described as demanding a single tradable element and offering a single tradable element. However, in further exemplary embodiments, trade-credit exchange processor 30 may be configured with software to allow a participant to place compound orders which demand one or more tradable elements and offer one or more tradable elements. In still further exemplary embodiments, trade-credit exchange processor 30 may allow participants to define limits on the aggregate volume of trade transactions pertaining to the compound order. An exchange order object for a compound order will include attributes pertaining to the transaction volume limits, the demand options, and the offer options.

For example, a man planning a business trip is open to staying at any one of five comparably-priced hotels with comparable features and location; all five of the hotels are participants. He also has some trade-credit, from three different participants, in his holding account that he would be glad to exchange for trade-credit from any of five hotels he is open to staying at. He only wants 100 dollars of trade-credit face-value, and only at one of the hotels (any single one of the five available). There are 15 different possible ways that the order can be executed. To cover all options the man would be willing to accept, it would require the man to enter 15 separate trade-orders. However, by entering 15 separate trade-orders, he may receive more hotel trade-credit than he wanted. The compound order allows him to conveniently place a single exchange order that meets his needs.

Trade-credit in the system available for a participant to demand is stored in tradable elements database 50. Tradable elements database 50 acts as a catalog of available trade-credits. Tradable element objects 55a, 55b, 55c, 55d and participant treasury account objects 57a, 57b, 57c, 57d are created for each unique trade-credit. In some exemplary embodiments, tradable elements database 50 may be searchable. For example, trade-credit exchange apparatus 100 and tradable element objects 55 may be configured to allow a participant to search tradable elements database 50. In still further exemplary embodiments, trade-credit exchange apparatus 100 may contain additional hardware or software components, including, but not limited to, processors, servers and filters, which allow a participant to search tradable elements database 50.

As illustrated in FIG. 1, trade-credit exchange processor 30 receives exchange order object 17 from participant 10b, when participant 10b places an exchange order, and updates active order database 60 to reflect the new active order. An active order object 65, containing attributes pertaining to the exchange order, is generated for each exchange order to be stored in active order database 60. Attributes pertaining to an exchange order may include, but are not limited to, the participant initiating the exchange order, the demand, the offer, and when the order was initiated. In some exemplary embodiments, trade-credit exchange apparatus 100 or active order database 60 may be configured with sort and filter processors to filter and sort active order objects 65.

To complete transactions, as illustrated in FIG. 1, trade-credit exchange processor 30 communicates with active order database 60 (and in some cases outside markets 90) to determine an exchange path linking demands and offers. Upon finding an exchange path, trade-credit exchange processor 30 executes simultaneous and mutual exchanges of tradable-elements amongst participants that form part of that exchange path. All tradable-elements acquired by a participant (i.e. trade-credit and/or common exchange media) via that exchange process are added to the participant's holding account. All trade-elements rendered by a participant in exchange for the tradable-elements acquired are subtracted either from the participant's holding account or from the participant's treasury account, depending on the source of the tradable-elements rendered. Trade-credit exchange processor 30 updates active order database 60, tradable elements database 50 and resource database 70 to reflect updates in the status of exchange orders and the ledger balances of tradable-elements in participants' treasury accounts and holdings accounts, as appropriate for the completed exchanges.

For example, in a simplified exemplary embodiment, Participant A initiates a trade-credit exchange order in which Participant A demands 100 trade-credit issued by Participant B and offers 100 of Participant A's own trade-credit. In further examples, Participant A may offer any available trade-credit from Participant A's treasury account or from Participant A's holdings account (i.e., any available trade-credit whether issued by Participant A or by another participant). Trade-credit exchange processor 30 accesses Participant A's treasury account in tradable elements database 50 and Participant A's holdings account in resource database 70 to verify the trade-credits offered are available. Trade-credit exchange processor 30 then accesses active order database 60 and uses trade search engine algorithms to determine an exchange path. If Participant B has an active trade-credit order in which Participant B demands 100 of Participant A's trade-credit in exchange for 100 of Participant B's own trade-credit, trade-credit exchange processor 30 matches the two trade-credit exchange orders and completes the transaction. The exchange path in the example described would include only Participant A and Participant B.

In other exemplary embodiments, trade-credit exchange orders may be completed between multiple participants, and an exchange path may include multiple participants. For example, in exchange for equal amounts of the participants' own trade-credit, Participant A may demand 100 trade-credits issued by Participant E, Participant B 100 trade-credit issued by Participant A, Participant C 100 trade-credits issued by Participant B, Participant D 100 trade-credits issued by Participant C and Participant E 100 trade-credits issued by Participant D. Using search algorithms, trade-credit exchange processor 30 matches the active trade-credit exchange orders from Participants A, B, C, D and E, creating a circular exchange path.

In further exemplary embodiments, a given set of exchange-orders (i.e. one or more) may be able to be used to complete only a limited subset of multiple incomplete exchange paths. For example, a trade-order initiated by a participant may be used to complete multiple exchange paths. Trade-credit exchange processor 30 may then use additional algorithms to determine the optimal exchange paths that the given set of exchange-orders are used to complete.

Trade-credit exchange processor 30 may also determine and process transactional fees (e.g. taxes, commissions, etc.) for exchange-orders that are executed. Those transactional fees may be based on a valuation assigned to the exchange-order. The valuation method used may be issuer-stated or an auction-based. Trade-credit exchange processor 30 is configured with software to run processes pertinent to both issuer-stated valuation methods and auction-based valuation methods and select the appropriate processes to calculate and pay transactional fees.

A valuation method is classified as issuer-stated if the issuer of the trade-credit is required to state a value in terms of a common exchange medium, for trade-orders where a participant is offering their own privately-issued trade-credit from their treasury account. A valuation method is classified as auction-based if the participant escrows off a percentage of his/her own privately-issued trade-credit to pay for transactional fees (the escrowed amount would typically be able to be auctioned-off with the proceeds used to pay the transactional fees).

In issuer-stated valuation methods the issuer is able to use all of the issued trade-credit to trade with, but is typically required to pay the transactional fees in terms of the common exchange medium associated to the valuation method chosen. In auction-based valuation methods a common exchange medium (e.g. cash) is not required to pay for the transactional fees, but the issuer is only able to use a portion of the total amount of issued trade-credit to trade with, while being liable to accept as payment all of the issued trade-credit.

There may be several different issuer-stated valuation methods available for a participant to choose from, and there may be several different auction-based valuation methods available for a participant to choose from. A participant can have different blocks of the same tradable-element in their treasury account, with a different valuation method assigned to each block.

Trade-credit exchange processor 30 also allows a participant to transfer tradable-elements from the participant's treasury account or holdings account into another participant's holdings account. In the exemplary embodiment shown in FIG. 1, participant 10c uses user interface 15c to create transfer object 19 containing information pertaining to the amount of tradable-element to be transferred and the participant to whom the tradable-element will be transferred.

Trade-credit exchange processor 30 receives transfer object 19, communicates with tradable elements database 50 and/or resource database 70 to validate that there are sufficient tradable elements in participant's 10c treasury and/or holding account available for the transfer, and simultaneously updates resource database 70 and tradable-elements database 50 appropriately.

Trade-credit utilization processor 40 processes the redemption of trade-credits. After a participant has received trade-credit (i.e., after a participant has obtained trade-credit issued by another participant), the participant may choose to redeem the trade-credit from its issuer by spending it (i.e. using the trade-credit as a form of payment to its issuer). When a participant redeems trade-credit, trade-credit utilization processor 40 updates resource database 70 to deduct the redeemed trade-credit assets from the redeeming participant's holding account and decrease the issuer's trade-credit obligations.

In an exemplary embodiment, a participant redeeming trade-credits may receive a redemption code which may be entered into the system by the issuer of the trade-credits. The code may be provided to a redeeming participant electronically (i.e., for use with an issuer's online redemption system) or in a printable format for the issuer to enter at the time of redemption.

In the exemplary embodiment shown in FIG. 1, participant 10d seeks to redeem trade-credit issued by participant 10e. Participant 10d, using user interface 15d, generates redemption request object 18d. Trade-credit utilization processor 40 receives redemption request object 18d and communicates with resource database 70 to validate and escrow the trade-credit being redeemed.

Participant 10e, the issuer of the trade-credits being redeemed, either synchronously or asynchronously, using user interface 15e, generates redemption object 18e. Redemption object 18e is received by trade-credit utilization processor 40, which updates resource database 70 appropriately.

Figure 2:
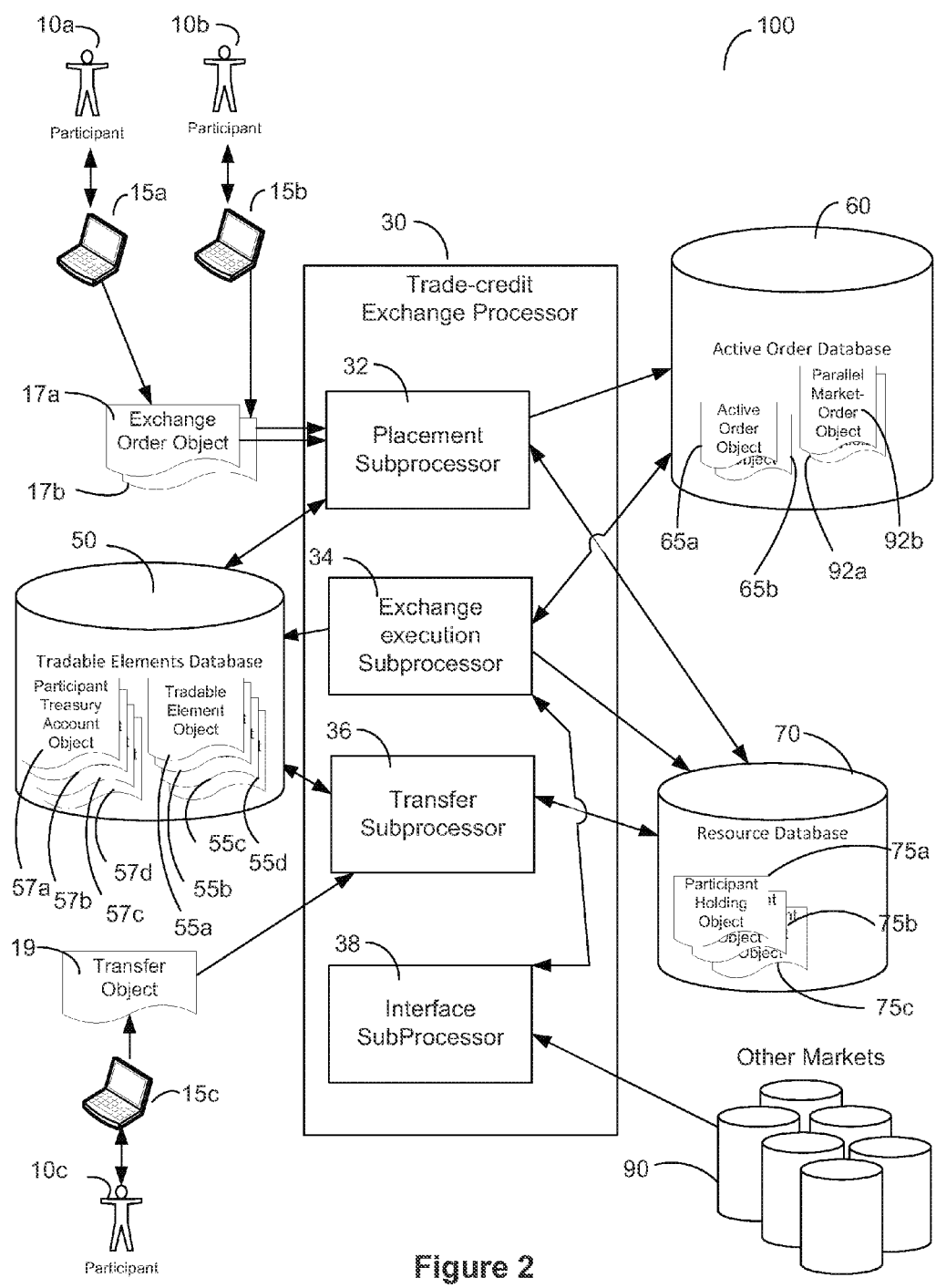
FIG. 2 is an exemplary embodiment of a trade-credit exchange processor with subprocessing components for a trade-credit exchange apparatus.

FIG. 2 illustrates trade-credit exchange processor 30 with subprocessing components 32, 34, 36 and 38. Placement subprocessor 32 is configured with software that allows participants 10a, 10b to communicate with tradable elements database 50 and/or resource database 70 to generate exchange order objects, use those exchange order objects to update active order database 60, and run at least one automated value-matching algorithm to place implicit parallel exchange-orders (i.e. exchange-orders not explicitly entered by participants) into active order database 60. Exchange execution subprocessor 34 is configured with software to communicate with active order database 60, run at least one trade-search algorithm in order to discover and process exchange paths and update resource database 70.

As illustrated in the exemplary embodiment shown in FIG. 2, participants 10a, 10b uses a user interfaces 15a, 15b to generate exchange order objects 17a, 17b. Placement subprocessor 32 uses exchange order objects 17a, 17b for updating active order database 60 to include the newly placed exchange-orders defined in exchange order objects 17a, 17b. Placement subprocessor 32 also runs at least one automated value matching algorithm to place implicit parallel exchange-orders 92a, 92b (i.e. exchange-orders not explicitly entered by participants) into active order database 60. Exchange execution subprocessor 34 regularly communicates with active order database 60 and runs at least one trade-search engine algorithm to discover exchange paths and execute exchanges of tradable-elements (e.g., trade-credit and common exchange media) by making corresponding updates to resource database 70. Exchange execution subprocessor 34 may also be configured to run additional algorithms to find the most efficient and/or optimal exchange paths for active orders.

Exchange execution subprocessor 34, upon finding an exchange path, terminates the active order objects 65a, 65b and parallel market order object 92a, 92b associated with the completed exchange, updates tradable elements database 50 to reflect any change in participants' treasury accounts, and updates participant holding objects 75a, 75b appropriately to reflect the completed exchange.

Transfer subprocessor 36 is configured with software to allow participant 10c to communicate with tradable elements database 50 and/or resource database 70 to generate transfer objects and execute transfers of tradable-elements by incrementing or decrementing participants' accounts as appropriate. As illustrated in the exemplary embodiment in FIG. 2, participant 10c uses user interface 15c to initiate tradable-element transfers. Transfer subprocessor 36 receives transfer object 19 and communicates with resource database 70 and/or tradable-elements database 50 to update participants' accounts appropriately.

Interfacing subprocessor 38 is configured with software to interact with other markets 90, such as the US dollar cash market, the Euro cash market, the silver market or any other market implied by the existence of available issuer-stated valuation methods for trade-orders. Participants can interface to other markets 90 to view and act upon open market-orders. In determining exchange paths, exchange execution subprocessor 34 also communicates with interfacing subprocessor 38 to complete any exchange paths using outside market 90 participants.

In the exemplary embodiment described in FIG. 2, trade-credit exchange processor 30 is illustrated as having four subprocessors 32, 34, 36, 38. In further exemplary embodiments, processes and functions carried out by subprocessors 32, 34, 36, 38, may be performed by separate processors. In still further exemplary embodiments, trade-credit exchange processor 30 may contain more or fewer subprocessors.

Figure 3:
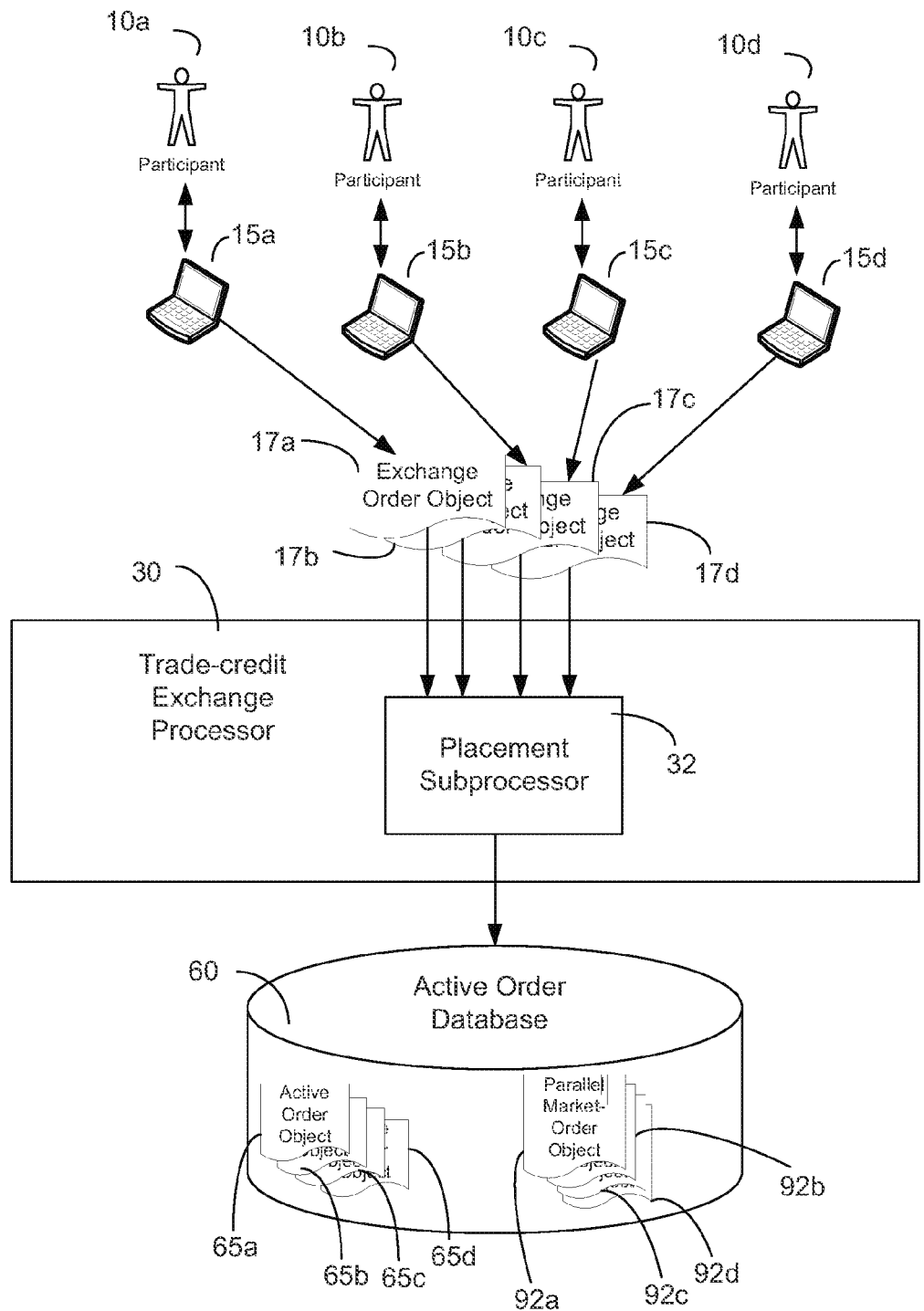
FIG. 3 is an exemplary embodiment of a trade-credit exchange processor placing parallel market-orders.

FIG. 3 is an exemplary embodiment of parallel exchange orders placed by placement subprocessor 32 with multiple trade-orders placed by multiple participants. In the exemplary embodiment shown, participants 10a, 10b, 10c, 10d, using user interfaces 15a, 15b, 15c, 15d, each generate an exchange order object 17a, 17b, 17c, 17d, where the valuation method associated with the trade-credit is an issuer-stated valuation. For example, participants 10a, 10b, 10c, 10d initiate trade-credit orders demanding either an amount of trade-credit or an amount of currency in exchange for the participant's issued trade-credit. Placement subprocessor 32 receives exchange order objects 17a, 17b, 17c, 17d and creates active order objects 65a, 65b, 65c, 65d and parallel market-order objects 92a, 92b, 92c, 92d. In this exemplary embodiment, active order objects 65a, 65b, 65c, 65d contain attributes pertaining to the desired trade-credit exchange option (i.e., the amount of trade-credit demanded and amount of trade-credit offered), and parallel market-order objects 92a, 92b, 92c, 92d contain attributes pertaining to the desired market-order option (i.e., the amount of cash demanded and amount of trade-credit offered). Placement subprocessor 32 of trade-credit exchange processor 30 places active order objects 65a, 65b, 65c, 65d and parallel market-order objects 92a, 92b, 92c, 92d in active order database 60.

For example, participant 10a may place a trade-order, with an issuer-stated valuation of $100, to exchange $100 face-value of trade-credit issued by participant 10a for $100 face-value of trade-credit issued by participant 10b. In this example, participant 10a would pay transactional fees based on the $100 valuation, and the order demanding $100 in exchange for $100 face-value trade-credit issued by participant 10a is placed as a separate order parallel to the order demanding $100 face-value of trade-credit issued by participant 10b.

Trade-credit exchange processor 30 is also configured to create market-order objects for exchange orders on incomplete exchange paths downstream from exchange orders with an issuer-stated valuation method. For example, in a simplified exemplary embodiment, if participant 10a places an exchange order, with an issuer-stated valuation of $90, demanding $100 face-value of trade-credit "XYZ" in exchange for $100 face-value of trade-credit "QRS." Placement subprocessor 32 receives exchange order object 17a generated by participant 10a and creates both an active order object 65a and parallel market-order object 92a for participant's 10a order. Active order object 65a demands $100 face-value of trade-credit "XYZ" and offers $100 face-value of trade-credit "QRS," while parallel market-order object 92a demands $90 real cash for $100 face-value of trade-credit "QRS."

Participants 10b, 10c, 10d all have exchange orders which are downstream from participant's 10a order. For each exchange order object 17b, 17c, 17d, generated by participants 10b, 10c, 10d, placement subprocessor 32 creates an active order object 65b, 65c, 65d and parallel market-order object 92b, 92c, 92d demanding $90 in exchange for $100 face-value of trade-credit being offered by participants 10b, 10c, 10d. Trade-credit being offered may be a participant's own privately-issued trade-credit or any participant's trade-credit the participant has available to exchange. While participants 10b, 10c, 10d neither explicitly placed market-orders nor offered a 10% discount on the face-value of their own issued trade-credits, parallel market-orders 92b, 92c, 92d are placed in active order database 60. As a result, any participant who may place an order matching any of the parallel market-orders corresponding to market-order objects 92b, 92c, 92d would complete an exchange path with participant 10a.

The creation and placing of parallel orders is a balancing mechanism that discourages participants from significantly understating the valuation of trade-orders. Participants may wish to understate the valuation of trade-orders in order to avoid or decrease transaction fees. However, a significantly low valuation may result in the participant receiving the low amount of common exchange medium (i.e., cash) instead of the desired amount of trade-credit demanded. For example, if a participant 10a, above, had placed an exchange order with an issuer-stated valuation of $10 instead of $90, parallel market-order objects 92a, 92b, 92c, 92d would each offer a quantity of trade-credits in exchange for $10. A participant in the cash market, paying $10, would complete the exchange path, and participant 10a would only receive $10 for the $100 face-value offered trade-credits.

In the exemplary embodiments described, above, trade-credit exchange processor 30 has interfaced with the USD-based cash market in transacting trade-orders. Trade-credit exchange processor 30 can also interface with other markets 90, such as markets that use other common exchange media. For example, trade-credit exchange processor 30 can also interface with the Euro, Yen, silver, gold and other commodity markets, as necessary, to match open exchange-orders and complete transactions.

While in the exemplary embodiments described in FIG. 3, participants 10a, 10b, 10c, 10d use an issuer-stated valuation pertaining to the USD cash market, in further exemplary embodiments, valuations may be based on any ISO 4217 currency (i.e. cash, gold, silver, etc.), or any other commodity a participant may use to place a value on an exchange.

Figure 4:
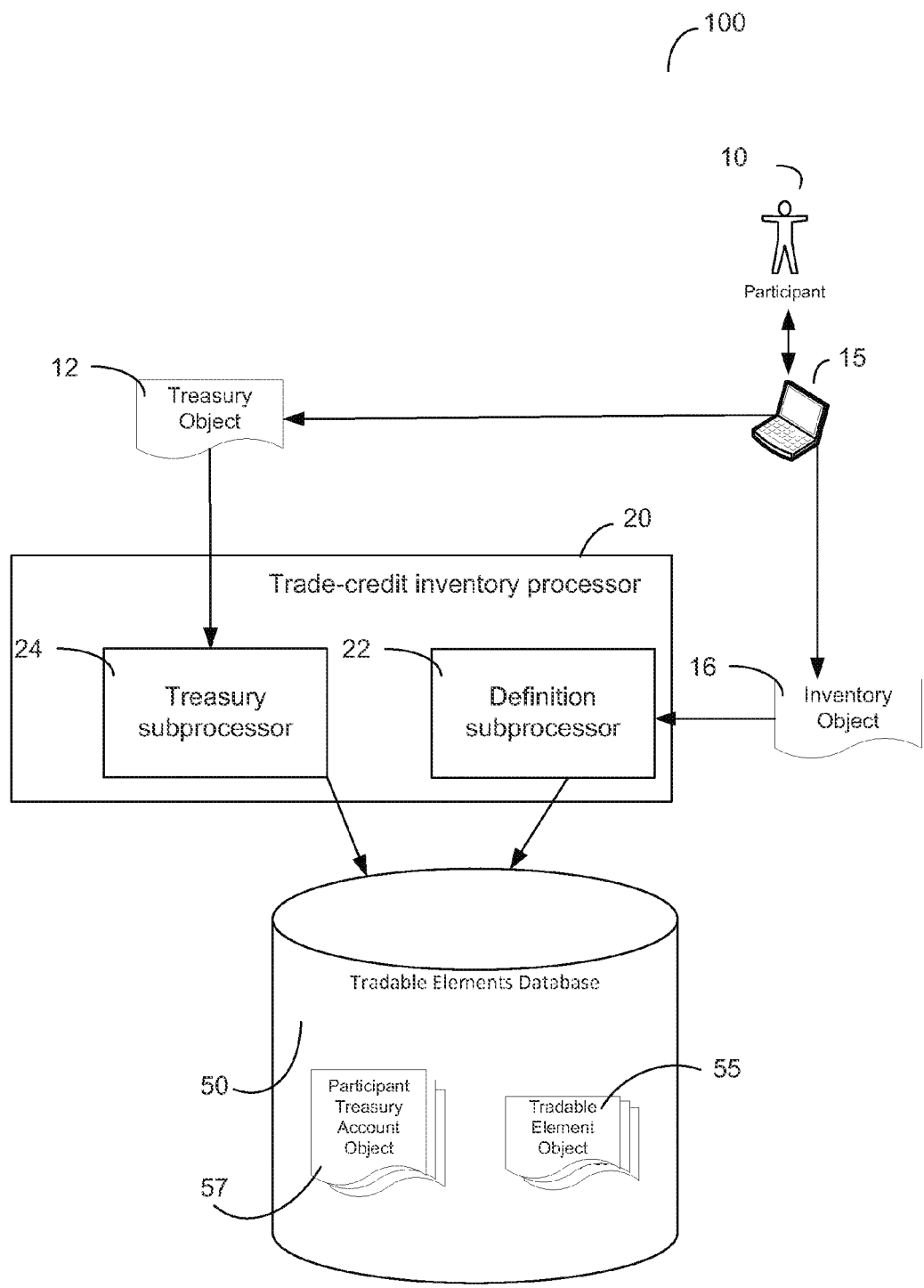
FIG. 4 is an exemplary overview of a trade-credit inventory processor for a trade-credit exchange apparatus.

FIG. 4 is an exemplary overview of trade-credit inventory processor 20 of trade-credit exchange apparatus 100. In the exemplary embodiment shown, trade-credit inventory processor 20 is configured with software to receive inventory objects and update tradable elements database 50 to reflect newly registered trade-credit available for participants to select in generating market-orders and trade-orders. Trade-credit inventory processor 20 also allows system administrators to register common exchange media into tradable elements database 50 as tradable elements. A common exchange medium being registered means that other participants are able to request or offer the common exchange medium in the creation of a market-order.

Trade-credit inventory processor 20 contains definition subprocessor 22, which receives inventory object 16 and defines tradable elements into tradable elements database 50. Trade-credit inventory processor 20 also contains treasury subprocessor 24, which issues trade-credit to a participant's treasury account.

As illustrated in FIG. 4, participant 10, using user interface 15, defines the tradable elements to be registered, generating inventory object 16. Definition subprocessor 22 of trade-credit inventory processor 20 receives inventory object 16 and updates tradable elements database 50 by generating tradable element object 55.

As illustrated in FIG. 4, participant 10, using user interface 15, defines the trade-credit to be issued, generating treasury object 12. Treasury subprocessor 24 of trade-credit inventory processor 20 receives treasury object 12 and updates tradable elements database 50 by generating participant treasury account object 57.

Once a tradable element is registered into tradable elements database 50, a participant may then issue trade-credit into his/her treasury account. As illustrated in FIG. 4, participant 10, using user interface 15, defines an amount of trade-credit to be issued and the valuation method to be used for trade-orders offering the trade-credit from the participant's treasury account and generates treasury object 12. Treasury subprocessor 24 of trade-credit inventory processor 20 receives treasury object 12 and updates tradable elements database 50 so that participant's 10 treasury account reflects the issued trade-credit with associated valuation method.

In some exemplary embodiments, a participant may indicate the type of trade-credit, to be issued. For example, a participant may indicate whether trade-credit is business trade-credit, personal trade-credit, labor trade-credit, specific element trade-credit, specific account trade-credit, specific labor trade-credit, tax trade-credit, specific remitter trade-credit, specific hire trade-credit and dividend and yield trade-credit. Trade-credit inventory processor 20 may be configured with software to allow a participant to make such designations.

In further exemplary embodiments, a participant may wish to limit the way in which the participant's own trade-credit is issued. For example, trade-credit inventory processor 20 may be configured with software to allow a participant to configure attributes pertaining to the trade-credit to be issued to the participant's treasury account, including, but not limited to, the type and timing of issuance of the trade-credit. In still further exemplary embodiments, trade-credit exchange apparatus 100 or trade-credit inventory processor 20 may include explicit or exclusionary filters to allow a participant configure attributes pertaining to trade-credit to be issued to the participant's treasury account.

In the exemplary embodiment shown in FIG. 4, trade-credit inventory processor 20 is illustrated as having two subprocessors 22, 24. In further exemplary embodiments, trade-credit inventory processor 20 may contain more or fewer subprocessors. In still further exemplary embodiments, processes and functions performed by subprocessors 22, 24 may be performed by independent processors.

Figure 5:
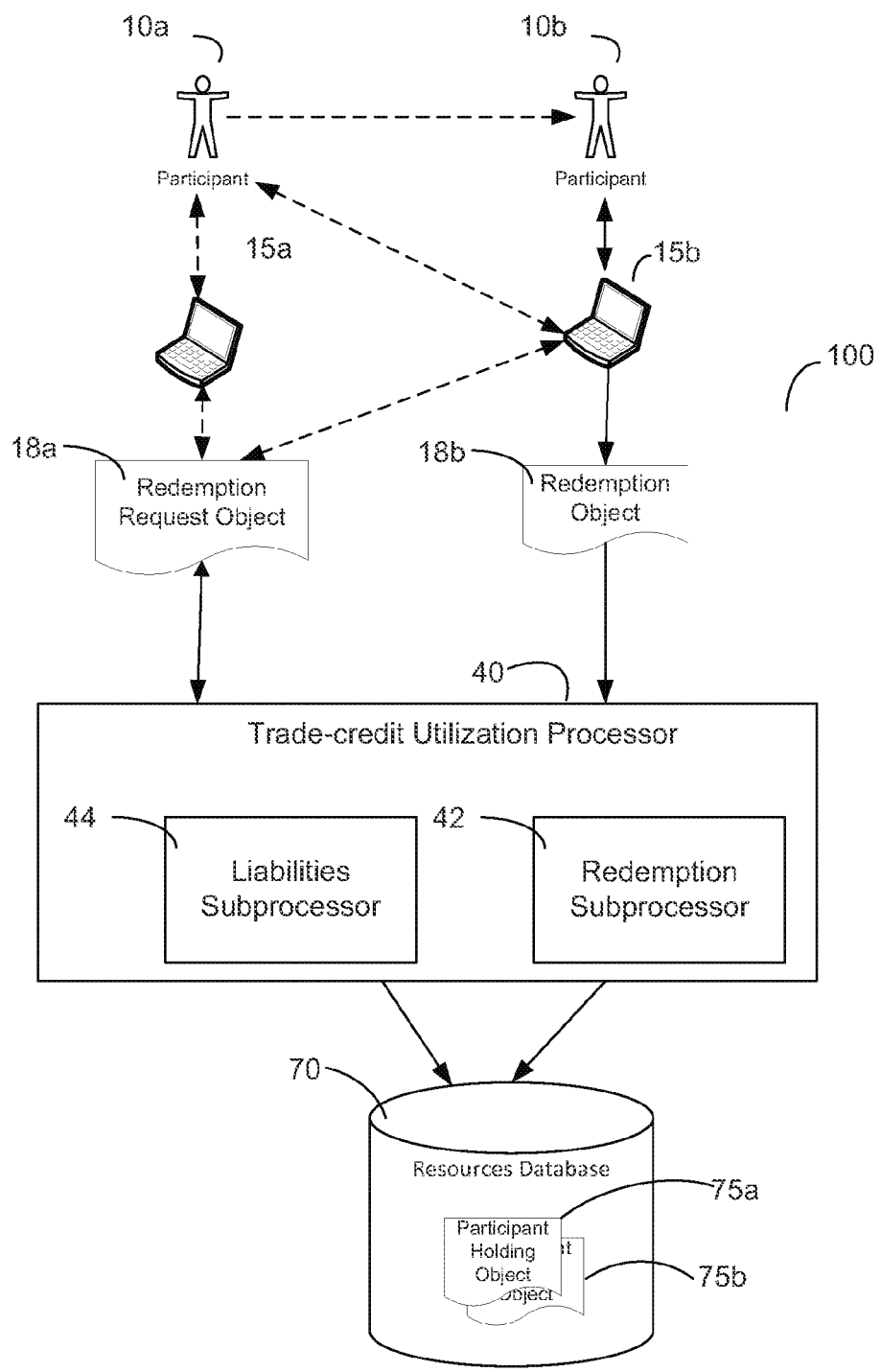
FIG. 5 illustrates exemplary trade-credit utilization features of a trade-credit exchange apparatus.

FIG. 5 illustrates exemplary trade-credit utilization features of trade-credit exchange apparatus 100. When participants redeem trade-credits from the issuers of the trade-credit, trade-credit utilization processor 40 is required to update participants' holding accounts to reflect the decrease in trade-credit assets and trade-credit obligations, as appropriate. As illustrated in FIG. 5, trade-credit utilization processor 40 contains subprocessing components 42, 44. Upon trade-credit utilization processor 40 receiving redemption request object 18a, redemption subprocessor 42 validates and escrows the quantity of the redeeming participant's trade-credit assets. Upon trade-credit utilization processor 40 receiving redemption object 18b, redemption subprocessor 42 decrements the redeeming participant's trade-credit assets, and liabilities subprocessor 44 decrements the trade-credit issuer's trade-credit obligations. Redemption subprocessor 42 exposes an application program interface (API) that allows the redeeming participant to create redemption request object 18 and the issuing participant to create redemption object 18b through any accounting mechanism known in the art, including, but not limited to, a swipable card, a web-based portal, and redemption codes.

In the exemplary embodiment illustrated in FIG. 5, participant 10a seeks to redeem trade-credits issued by participant 10b. Participant 10a, either asynchronously by using user interface 15a or synchronously by using participant's 10b user interface 15b, such as in a point-of-sale situation, creates redemption request object 18a. Trade-credit utilization processor 40 receives redemption request object 18a and redemption subprocessor 42 validates and escrows the appropriate quantity of participant's 10a trade-credit assets. Participant 10b, upon receiving redemption information from participant 10a, either asynchronously or synchronously, creates redemption object 18b with attributes pertaining to the trade-credit being redeemed. Trade-credit utilization processor 40 receives redemption object 18b and redemption subprocessor 42 appropriately decrements the trade-credit asset balance in participant holding object 75a of the redeeming participant. Liabilities subprocessor 44 appropriately decrements the trade-credit obligations in participant holding object 75b of the issuing participant (participant 10b).

In the exemplary embodiment shown in FIG. 5, trade-credit utilization processor 40 is illustrated as having two subprocessors 42, 44. In further exemplary embodiments, trade-credit utilization processor 40 may contain more or fewer subprocessors. In still further exemplary embodiments, processes and functions performed by subprocessors 42, 44 may be performed by independent processors.

In yet further exemplary embodiments, participants may be able to define or select a redemption period for issued trade-credit. For example, trade-credit exchange apparatus 100 may be configured with software to allow a participant issuing trade-credit to define 12 blocks of trade-credit for $1,000 face-value where each block is redeemable only in one of twelve consecutive months.

What is claimed is:

1. A method of creating spendable trade-credit assets comprising the steps of:

receiving, in a trade-credit inventory processor, from a first participant via a first user interface, (i) an amount of first trade-credit to be issued; and (ii) one or more valuation methods to be used for the amount of first trade-credit to generate a first inventory object associated with the first participant;

updating, by the trade-credit inventory processor, a first participant treasury account associated with the first participant in a tradable elements database to reflect the amount of first trade-credit to be issued as a first tradable element object;

receiving, in the trade-credit inventory processor, from a second participant via a second user interface, (i) an amount of second trade-credit to be issued; and (ii) one or more valuation methods to be used for the amount of second trade-credit to generate a second inventory object associated with the second participant;

updating, by the trade-credit inventory processor, a second participant treasury account associated with the second participant in the tradable elements database to reflect the amount of second trade-credit to be issued as a second tradable element object;

receiving, from the first participant, in a trade-credit exchange processor, a first trade-order including (i) an identification of the first participant, (ii) a demand, and (iii) an amount of first trade-credit offered for meeting the demand, wherein the amount of first trade-credit offered is less than or equal to the amount of first trade-credit to be issued from the first participant treasury account or an amount of a first spendable trade-credit asset in a first participant holdings account;

in response to receiving the first trade-order, updating, by the trade-credit exchange processor, an active order database to reflect the first trade-order as a first active order object including (i) an identification of the first participant, (ii) a first demand, and (iii) an amount of first trade-credit offered for meeting the first demand;

receiving, from the second participant, in the trade-credit exchange processor, a second trade-order including (i) an identification of the second participant, (ii) a demand, and (iii) an amount of second trade-credit offered for meeting the demand, wherein the amount of second trade-credit offered is less than or equal to the amount of second trade-credit to be issued from the second participant treasury account or an amount of a second spendable trade-credit asset in a second participant holdings account;

in response to receiving the second trade-order, updating, by the trade-credit exchange processor, the active order database to reflect the second trade-order as a second active order object including (i) an identification of the second participant, (ii) a second demand, and (iii) an amount of second trade-credit offered for meeting the second demand;

automatically determining an exchange path linking through a closed-loop series of one or more active order objects stored in the active order database, the exchange path including the first trade-order and the second trade-order, wherein each link in the closed-loop series connects a trade-order including a demand to a corresponding amount of trade-credit offered for meeting the demand, wherein the linked demand and corresponding amount of trade-credit being offered for meeting the demand are each associated with a different active order object defining a linked pair of active order objects, further wherein each of the linked pair of active order objects is associated with a different participant; and in response to automatically determining the exchange path linking through the closed-loop series of one or more active order objects including the first trade-order and the second trade-order, creating in the first participant holding account the first spendable trade-credit asset corresponding to the amount of first trade-credit offered for meeting the first demand in the first trade-order, and creating in the second participant holding account the second spendable trade-credit asset corresponding to the amount of second trade-credit offered for meeting the second demand in the second trade-order;

wherein the first spendable trade-credit asset is only created after the amount of first trade-credit offered for meeting the first demand in the first active order object is linked to an active order object from a participant other than the first participant; and wherein the second spendable trade-credit asset is only created after the amount of second trade-credit offered for meeting the second demand in the second active order object is linked to an active order object from a participant other than the second participant such that the first and the second spendable trade-credit assets are only created after the exchange path linking through the closed-loop series of the one or more active order objects including the first trade-order and the second trade-order is automatically determined, and further that the first and the second spendable trade-credit assets are not fungible assets.

2. The method of claim 1, wherein the one or more valuation methods includes an issuer-stated valuation method.

3. The method of claim 1, wherein the one or more valuation methods includes an auction-based valuation method.

4. The method of claim 1, wherein the step of automatically determining the exchange path linking through the closed-loop series of one or more active order objects stored in the active order database includes using at least one algorithm selected from a group consisting of a trade-search algorithm and an automated value-matching algorithm.

5. The method of claim 1, wherein the trade-credit exchange processor is further configured with software to run algorithms to automatically determine a most efficient exchange path linking through the closed-loop series of one or more active order objects stored in the active order database.

6. The method of claim 1, wherein the trade-credit exchange processor is further configured with software to run at least one valuation process selected from a group consisting of one or more issuer-stated valuation processes, one or more auction-based valuation processes, and combinations thereof.

* * * * *